(12) United States Patent
Aubineau et al.

(10) Patent No.: US 9,679,541 B2
(45) Date of Patent: Jun. 13, 2017

(54) METHOD OF DISPLAYING A PIXEL OF AN IMAGE ON A SCREEN BASED ON A LOCATION OF THE PIXEL ON THE SCREEN

(71) Applicants: Vincent Aubineau, Areches (FR); Daniel McKenna, Glasgow (GB); Michael Andreas Staudenmaier, Munich (DE)

(72) Inventors: Vincent Aubineau, Areches (FR); Daniel McKenna, Glasgow (GB); Michael Andreas Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/707,531

(22) Filed: May 8, 2015

(65) Prior Publication Data
US 2016/0163290 A1    Jun. 9, 2016

(30) Foreign Application Priority Data
Dec. 8, 2014  (WO) .................. PCT/IB2014/002913

(51) Int. Cl.
*G09G 5/395*  (2006.01)
*G06T 15/40*  (2011.01)
*G09G 5/36*  (2006.01)
*G09G 5/14*  (2006.01)

(52) U.S. Cl.
CPC ............. *G09G 5/395* (2013.01); *G06T 15/40* (2013.01); *G09G 5/363* (2013.01); *G09G 5/14* (2013.01); *G09G 2310/04* (2013.01); *G09G 2330/021* (2013.01); *G09G 2350/00* (2013.01)

(58) Field of Classification Search
None
See application file for complete search history.

(56) References Cited

U.S. PATENT DOCUMENTS

| 5,790,096 | A  | * | 8/1998  | Hill, Jr. .................. G09G 5/005 345/600 |
| 6,577,679 | B1 | * | 6/2003  | Apostolopoulos ... H04N 19/176 348/420.1 |
| 8,094,105 | B2 |   | 1/2012  | Lim et al. |
| 8,593,473 | B2 |   | 11/2013 | Levasseur et al. |
| 2009/0167633 | A1 | * | 7/2009 | Cohen ...................... G09G 5/14 345/1.1 |
| 2011/0249903 | A1 |  | 10/2011 | Duga et al. |

(Continued)

FOREIGN PATENT DOCUMENTS

WO       2010025967 A1    3/2010

*Primary Examiner* — Joni Richer

(57) ABSTRACT

A display system and a method of displaying an image are hereby presented. The display system is arranged to display an image on a screen which has at least one useful screen area which is intended to be seen by a user and at least one non-useful screen area which the user cannot see. The display device comprises a bandwidth saver unit arranged to determine a location on the screen of a current pixel to be displayed. If the pixel is located in a non-useful screen area of the screen, then the fetching from a data memory of a pixel value is inhibited by the bandwidth saver unit with respect to this pixel, and a replacement, fixed pixel value is passed to a data processing unit for further processing.

17 Claims, 3 Drawing Sheets

(56) References Cited

U.S. PATENT DOCUMENTS

2012/0165073 A1* 6/2012 Griffin .................... H04B 1/38
                                                        455/566
2014/0139740 A1   5/2014 Ohba et al.
2016/0116913 A1* 4/2016 Niles .................... G05D 1/0061
                                                        701/23

* cited by examiner

METHOD OF DISPLAYING A PIXEL OF AN IMAGE ON A SCREEN BASED ON A LOCATION OF THE PIXEL ON THE SCREEN

CROSS REFERENCE TO RELATED APPLICATION(S)

The present application claims priority to International Patent Application No. PCT/IB2014/002913, entitled "A DISPLAY SYSTEM, A METHOD OF DISPLAYING AN IMAGE ON A SCREEN AND AN ASSOCIATED COMPUTER PROGRAM PRODUCT," filed on Dec. 8, 2014, the entirety of which is herein incorporated by reference.

FIELD OF THE INVENTION

This invention relates to a display system, a method of displaying an image on a screen and an associated computer program product.

BACKGROUND OF THE INVENTION

Display devices are capable of restituting information data to a user in a visual manner, by using pixels to create an image on a screen. In order to increase the visual comfort of the user, there is a trend that screens are made bigger and bigger and therefore a higher image quality is required. Moreover, in order to enhance the display capabilities and have more information available at the same time, in some applications several screens of various size and shapes are used for displaying information on one and the same display board, for instance. Also, in order to save space, screens may be partially occluded by plastic covers. Therefore there may be parts of a screen that are hidden so that it is not seen by the user.

Most display devices have a rectangular screen since the rectangular shape is particularly convenient for the manufacture and control of the screen. It results thereby that the current state of the art of data processing for displaying images is tied to the rectangular shape of conventional screens. For instance, frame buffers, which are data memory areas wherein pixel values associated with respective images are stored before being processed in order for the images to be displayed in sequence, may be designed as data structures wherein data is addressable by rows and columns. Indeed, such data structure conveniently suits a rectangular display screen for which pixels of an image are also arranged as a matrix of N rows and M columns, where N and M are integral numbers.

Display systems further include a data processing unit for fetching pixel values from frame buffers of the data memory, and converting the pixel values into electrical signals suitable for controlling the display of the successive images on the screen. The pixel values of an image are sequentially displayed within a predetermined period of time tied to the refresh rate of the screen, which may be 50 Hz or 60 Hz, for instance, for standard video applications. However, the updating rate for pixel values in the frame buffers is limited as a result of technological and/or functional limitations of the data memory. When access to the data memory is too slow or is constrained by existing priorities to serve other host units, it may be impossible to fill the buffers at a rate required by the data processing unit, for instance at a rate of 50 Hz or 60 Hz. Given that the data processing unit is configured to update the image displayed on the screen at a steady frame rate which is independent of the latency associated with accesses to the data memory, the data processing unit may continue the processing whereas one or more frame buffers lack updated pixel values. Therefore, the data processing unit may fetch non-updated pixels values from the frame buffers, which may result in a failure to display the intended images properly. Going forward, if the latency gets too high, the pixel values are not available and the data processing unit may send arbitrary values to the screen (because the old pixel values are no longer available).

Hence, the image seen by the user on the screen may have a degraded quality due to bandwidth issues with respect to the access to frame buffers in data memory.

SUMMARY OF THE INVENTION

The present invention provides a display system, a method of displaying an image on a screen, and an associated computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
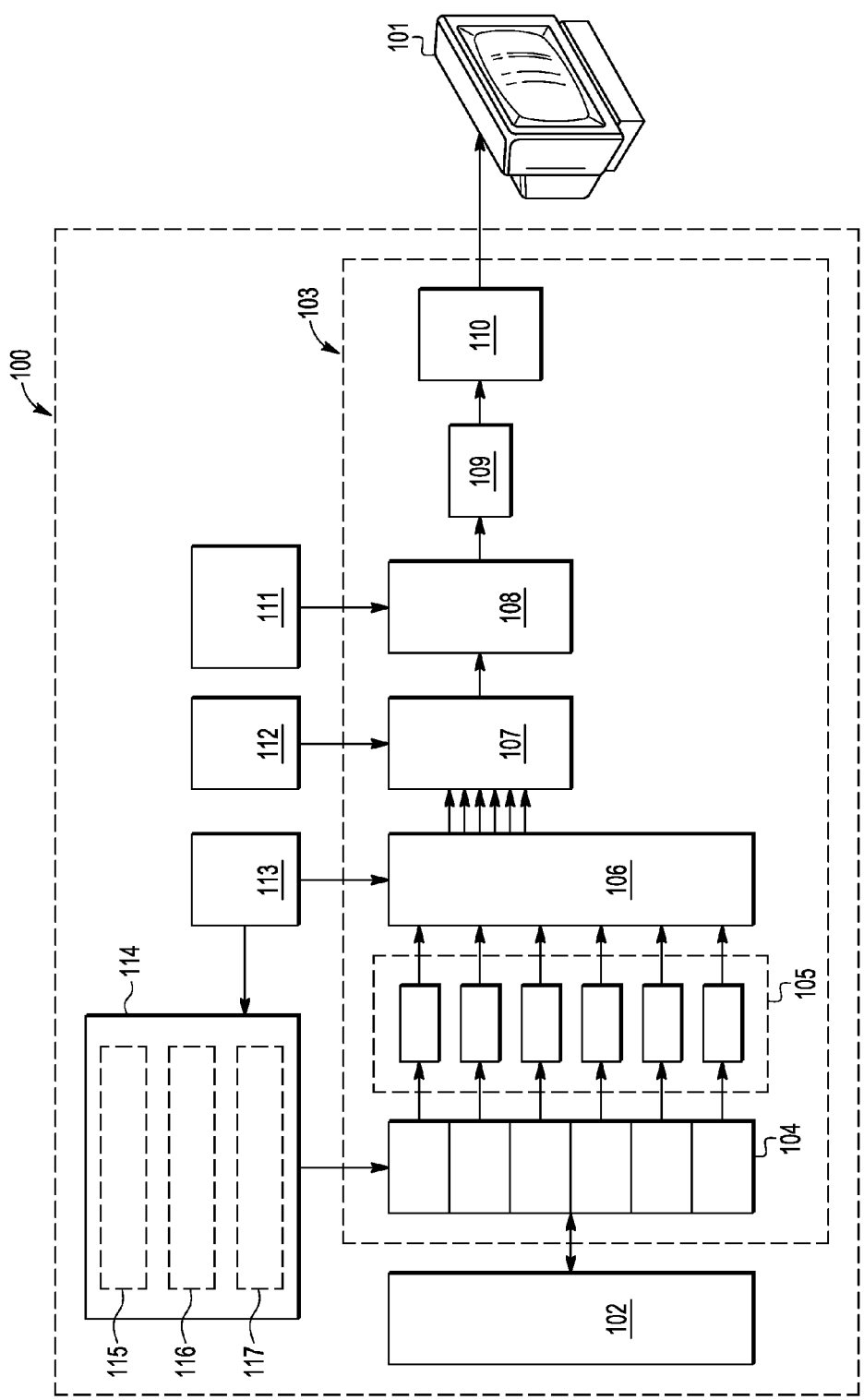
FIG. 1 schematically shows an example of a display system.

In the following specification, the various aspects the invention will be described with reference to specific embodiments. It will, however, be evident to the one with ordinary skills in the art that various modifications and changes may be made therein without departing from the broader scope of the invention as set forth in the appended claims.

Herein below example of a display system arranged to display an image on a screen having useful screen areas intended to be seen by a user and non-useful screen areas not visible by the user are described. The display system comprises a data memory, a data processing unit and a memory access control unit.

The data memory is arranged to store pixels values of the image to be displayed. The data processing unit is arranged to control the display of pixels on the screen. The memory access control unit is arranged to determine whether at least one pixel to be processed by the data processing unit for displaying on the screen belongs to a useful screen area or to a non-useful screen area of the screen and, if the pixel belongs to a non-useful screen area, to inhibit the fetching of a pixel value associated with said pixel from the data memory to the data processing unit and to force said pixel with a fixed value for the purpose of the processing by the data processing unit. This allows to save memory bandwidth required for accessing pixel data in frame buffers and thus enhance the performance of the display system and the quality of the displayed images.

Although the display system can be used in other fields, saving memory bandwidth can be of particular importance in applications such as the display of information on automobile dashboards. In such applications, indeed, the space available on the dashboard for displaying information to the driver is limited, whereas a significant and ever increasing amount of information of many types need to be displayed, such as the driving speed, various information regarding the running state of the car, map information and driving instructions for navigation purpose, etc. For this reason, display systems in the automotive field are complex, for instance they include several, partially overlapping screens, each screen being associated with a respective plane of the data structure used for storing the overall image data to be processed by the data processing unit of the display system. Further, automobile manufacturers request from their suppliers display devices having an update frequency of 120 Hz or 144 Hz, and accordingly this requires a memory bandwidth more than doubled as compared with standard video applications.

By defining the non-useful screen area as the parts that a user cannot perceive, only those pixels which are seen by the user are fetched from the frame buffers since the fetching of a pixel value associated with the pixel from the data memory is inhibited if the pixel belongs to a non-useful screen area. In contrast, in known display systems, pixel values of all the pixels of the screen are read from the buffer memory, even if the associated pixel is hidden because an area of the screen may be occluded. Consequently, not fetching pixel values from the frame buffers for these invisible pixels allows saving memory bandwidth, thus enabling displaying an image with a better quality.

Referring to FIG. 1, the block-diagram shown there in is of an integrated circuit (IC), such as a system-on-chip (SoC) or system in a package, implementing a display system 100 suitable for controlling the display of images on a visual display unit, such as a screen 101. It will be apparent that the IC may be a microcontroller or other type of microprocessor, and comprise multiple processing cores, such as at least one of a central processing unit (CPU), a graphical processing unit (GPU), and a digital signal processor (DSP), which are not specifically or individually represented in the figure.

Figure 3:
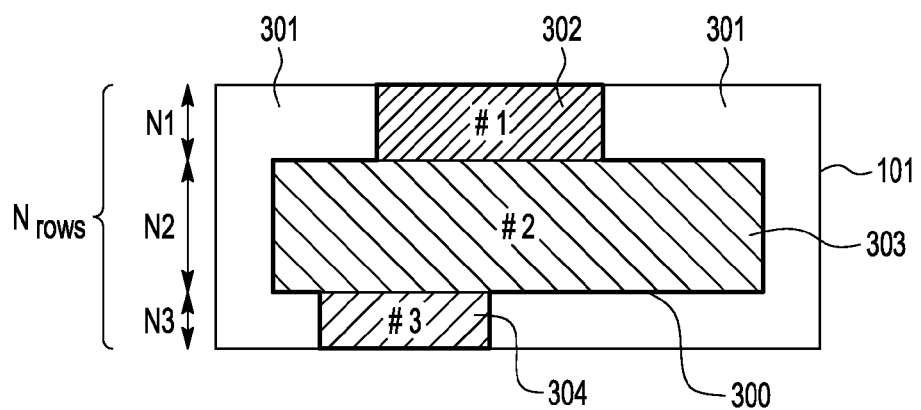
FIG. 3 shows a rectangular screen having rectangular useful screen areas and non-useful screen areas, which can be used in the system of FIG. 1.

The screen 101 may be a Liquid Crystal Display (LCD), such as a thin-film transistor (TFT) LCD. With reference to FIG. 3, the screen 101 may have, for instance, a rectangular shape, though the screen may have another shape as well. As shown in the example of FIG. 3, the screen 101 has at least one useful screen area 300 which, in actual situation of use, can be seen by a user, as well as at least one non-useful screen area 301 which cannot be seen by the user. For instance, in the context of e.g. a display system for a dashboard of a vehicle, the screen area 301 may be hidden by one or a plurality of other screens and/or visual display units. Although the example of FIG. 3 shows only one useful screen area and one non-useful screen area for the sake of simplicity, it will be appreciated that the embodiments are not limited to this example, and that a plurality of useful and non-useful screen areas can be managed according to the teaching of the present description.

The display system 100 may include a data memory 102 such as a digital memory capable of storing image data in digital form, for examples as pixel values. The data memory 102 may be a dedicated low speed memory such as a flash memory, for example a QSPI NOR flash memory. The data memory 102 may also be a shared memory such as a Random Access Memory (RAM), or an internal flash memory. In case the display system is implemented on an IC, such as a microcontroller, the data memory may e.g. be on-chip memory.

The display system 100 may further include a data processing unit 103. The data processing unit, also called display controller, may be a sprite-based display controller. In case the display system is implemented on an IC, the processing unit 103 may e.g. be a display control unit (DCU) which can directly drive a display (e.g. a TFT display) connected to output pins of the IC, such as for example the DCU called "2D-ACE" (2D Animation and Composition Engine) as used in microcontrollers manufactured by Freescale Semiconductor, Inc. The display system 100 may partially or completely be integrated in the The data processing unit 103 may comprise a memory access unit 104 arranged to access the memory. In the shown example, the memory 102 is structured such that each address range corresponds to a respective data channel, and the data processing unit 103 can access the memory via different address ranges. In the shown example, the image is formed by the data processing unit 103 by merging several image layers. Each plane is assigned to a respective data channel. The display planes may correspond to, a bottom plane associated with e.g. a background image, a top plane associated with e.g. overlay characters, and one or more middle planes associated with various types of graphical objects (for instance, icons or more elaborated objects such as the needle of a speedometer, for instance), colour spaces, resolutions, etc. . . . In the example as shown, there are six planes. For each pixel on the screen, there are several pixels in the different planes that are merged together. Therefore, a plurality of pixel values, each respectively associated with a respective plane, may be combined by the data processing unit 103 to display one single pixel on the screen 101. It will be apparent that the data processing unit may use more or less layers and that the data processing unit 103 may be also be a simple display controller which comprises e.g. a single data channel associated with a single display plane.

As shown in the example of FIG. 1, the data processing unit 103 may for example comprise a number of buffers 105, for instance First-In-First-Out (FIFO) input buffers, which may buffer the pixel values retrieved from the memory 102, and further control retrieving the pixel values, e.g. based on the state of the buffer or to periodically update the buffers. In the shown example for instance, the memory access unit 104 is operably connected between the data memory 102 and a set of buffers 105. While the buffers are being filled with the pixel values from the memory 102, the pixel value is being read out of buffers and processed by one or more functional units of the data processing unit. The number of buffers 105 may for instance correspond to the number of data channels. Thus, each buffer 105 may be associated with, and used for, a respective data channel.

The pixel values of the various planes are merged into a single pixel value to be outputted by the components of the data processing unit 103 downstream, in a pixel processing flow direction, of the buffer(s) 105. In the shown example, the set of buffers 105 is operably connected to a pixel format converter 106. The pixel format converter 106 is arranged to convert pixel values into a common format for further processing, for example a 32-bit per pixel value structure. Indeed, such conversion may be necessary for being able to combine the pixel values of the various planes in a single, common format. As shown, the data processing unit 103 may further comprise a blending unit 107 coupled to the pixel format converter 106. The blending unit 107 is arranged to combine a plurality of pixels, such as six pixels respectively output by the six channels in the example of FIG. 1. Such combination may be carried out with respect to the different channels in a predetermined order, and according to desired alpha and chroma setting or any other display-related setting. The exact blending configuration to be employed is obtained from registers (not shown) by the blending unit 107, thereby configuring the order and desired display-related settings.

A gamma correction unit 108 may then be operably connected to the output of the blending unit 107 and arranged to correct a gamma parameter for blending any pixel value outputted by the blending unit 107.

Finally, an output buffer, such as a FIFO output buffer, 109 may be connected between the gamma correction unit 108 and a display driver 110 which drives the screen 101 based in on the pixel value outputted by the gamma correction unit 108. As a result, (except for errors or distortions generated in the display), the pixel is outputted on the display as defined by the pixel value.

In addition to the processing resources of the data processing unit 103, the display system 100 may further comprise several memories, e.g. Random-access memory (RAM), such as a gamma RAM 111, a cursor RAM 112 and a Color Look-Up Table (CLUT) 113 which may also be a RAM. The gamma RAM 111 may be used by the gamma correction unit 108, for instance, to correct the gamma parameter. The cursor RAM 112 may be used by the blending unit 107 to display a cursor on the screen 101. Finally, the CLUT 113 may be used by the pixel format converter 106 in order to affect the right colour to the pixel to display, depending to the retrieved pixel value.

Figure 2:
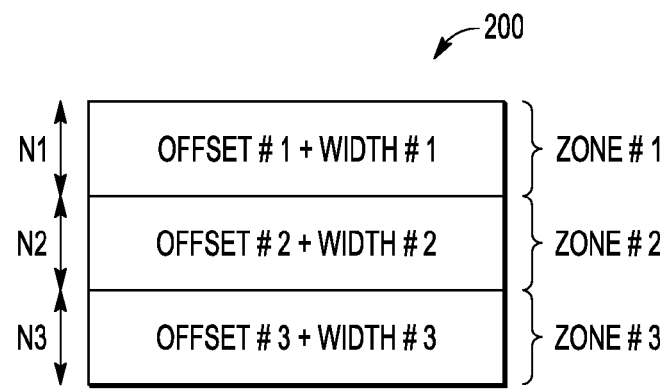
FIG. 2 shows an example of a memory table which can be used to define different screen areas of a screen in the system of FIG. 1.

The display system 100 may further comprise a memory access control unit 114. The memory access control unit 114 may be operably connected to the memory access unit 104 of the data processing unit 103. In one example, the memory access control unit 114 may be arranged to implement a memory table 200 (such as shown in FIG. 2) defining, e.g. the useful screen area 300 (such as shown in FIG. 3) of the screen 101. In another example, the table 200 may, conversely, define the non-useful screen area 301 (shown in FIG. 3) of the screen 200 based on the same principle which shall be described below. It will be apparent that in the memory access control unit 114 any other suitable type of data defining the useful and non-useful screen areas 300,301 may be stored instead.

The memory access control unit 114 may further comprise a comparator 116 which is arranged to compare the position of the current pixel of the screen, for which the processing by the by the data processing unit 103 is running, with the data contained in the memory access control unit 114, in order to determine whether the pixel belongs or not to a useful screen area 300 of the screen 101.

In the example as shown, the memory access control unit 114 may comprise a counter 115 whose count value defines a position of a current pixel in the screen for which the processing by the by the data processing unit 103 is running. The counter 115 is preferably a N×M counter, meaning that it can count up to the total number of pixels of the image formed by the N lines and the M columns of the screen 101. The comparator 116 may e.g. compare the value of the counter with the information in the table to determine the zone in which the current pixel lies.

It will be apparent that the position of the current pixel and the area of the display in which it is located may be determined in any suitable manner. For example, the memory access control unit 114 may comprise two counters 115 and two comparators 116, one for comparing the line numbers and one for comparing the column numbers, respectively.

In addition, the memory access control unit 117 may further comprise a control unit 117 which is arranged to inhibit the fetching of a pixel value from the data memory 102 to the data processing unit 103. More specifically, the memory access unit 104 is prevented from accessing the pixel value in the data memory 102 if the corresponding pixel of the screen is determined to be located in a non-useful screen area of the screen 101, such as non-useful screen area 301 shown in FIG. 3. In contrast, the fetching of the pixel value is allowed if the pixel is located in a useful screen area of the screen 101, such as useful screen area 300 shown in FIG. 3.

Moreover, if the pixel is located in a non-useful screen area of the screen 101, then the memory access control unit 114 provides a replacement value, e.g. a fixed value to the memory access unit 104 in order to replace the pixel value. Namely, the pixel value which is actually passed to the data processing unit 103 with respect to the current pixel is forced to said fixed value, whatever the pixel value stored in the memory 102 for said pixel.

The fixed value may programmable and may be stored, for example, in a register (not shown). The fixed value may correspond to a black pixel when displayed on the screen 101, e.g. it may equal zero in a colour system wherein pixel values range from zero for black pixels to a maximum value corresponding to white pixels. In another example, the fixed value may correspond to another colour, for example white. The fixed value may also correspond, in still other embodiments, to any predetermined colour pattern suitable for the application.

With reference to FIG. 2 for example, the table 200 may be stored in a local memory. The local memory may be a generic memory such as a RAM, for instance a SRAM, a DRAM, a SDRAM, etc. In the example illustrated by the FIG. 1, the table 200 (shown in FIG. 2) may be stored in the GLUT 113. In such a case, the GLUT may be a shared memory having at least two inputs. Using such an existing memory for storing the table 200 allows using the existing data processing unit 103 hardware, and may also result in a fast, low cost and low size implementation. In other examples, the table 200 may be stored in the cursor RAM 112 or in the gamma RAM 111. Further, in still another embodiment, the memory access control unit 114 may comprise a dedicated RAM for storing the table 200.

The useful screen area 300 of the screen 101 may be partially defined by the table 200. For example, the useful screen area 300 can be approximately described by dividing the complete screen 101 into several zones. Each zone may have the same basic shape but with respective dimensions. Thus, in the present example, the useful screen area 300 is described using several rectangles, each one corresponding to a zone. Thereby the amount of memory required for the definition, and accordingly the table 200, is limited compared to a very precise screen description with a pixel per pixel description. The rectangles may be described using three parameters: an offset, a width and a number of lines. The offset may be defined as a number of pixels between the very first pixel of the line and the first pixel of the line which falls within the useful screen area 300 along the same line of the screen 101, that is to say on the horizontal axis. For the purpose of the present description, the term "width" is used to refer to the dimension of the rectangle along the horizontal axis, namely the number of adjacent pixels in each line of the useful screen area of interest. In other words, the width may be defined as the number of pixels between the first pixel and the last pixel which are in the useful screen area 300 along the same pixel line of the screen 101, that is to say on the horizontal axis. Similarly, the terms "number of lines" correspond to the dimension of the rectangle along the vertical axis, namely the number of lines of the useful screen area. Therefore, a set of offset/width/number of lines defines exactly one zone and refers to a line in the table 200. In case there are several zones on the screen 101, the table 200 may then present several line entries, each one preferably corresponding to a zone. Also, the vertical offset of the rectangle may be given by first entry in table 200 for which said offset/width couple is set. Thus, each pixel contained in one of the rectangular zones as defined above is said to belong to the useful screen area 300. In the present example, each rectangular zone is defined as a 32-bit code. For example, for any possible rectangle in the screen, the offset is coded by 13-bit binary word, the width is coded be a 13-bit binary word.

Referring to FIG. 2 and to FIG. 3, an example of the table 200 and an example of the useful screen area 300 of the screen 101 are respectively illustrated therein. In the shown example, the useful screen area 300 can be divided into three elementary zones. The arrangement on the screen 101 of these three elementary zones is illustrated by FIG. 3. Each elementary zone is defined, using the offset, the width and the number of lines parameters, in the table 200 stored in the local memory and illustrated by FIG. 2. In this example, the elementary zones are rectangular, which shape having the advantage of being easy to define of allowing a simple comparison scheme to be implemented. Each line of the table 200 of FIG. 2 defines one of rectangular elementary zones 302, 303 and 304 of the at least one useful screen area 300 shown in FIG. 3. For instance, a first zone 302 is defined with an offset equal to 40, a width equal to 160 and a number of lines equal to 30. Similarly, a second zone 303 is defined with an offset equal to 15, a width equal to 225 and a number of lines equal to 60. Similarly, a third zone 304 is defined with an offset equal to 33, a width equal to 100 and a number of lines equal to 16. Consequently, in this example there are two different non-useful screen areas 301 which are the two disjoint screen areas at the left and at the right of the useful screen area 300 which complement said screen area 300 within the overall surface of the screen 101.

It will be apparent to the one with ordinary skills in the art that the above example is not limiting. In particular, the screen 101 may have several useful screen areas 300, each of which can be divided into a respective number of elementary zones of rectangular shape. In another embodiment, the rectangular zones may be defined using different parameters such as graphic organizer x, y and z. Besides, in other embodiments (not shown), the useful and non-useful screen areas, and/or the elementary zones thereof may have another shape, for instance they may have a circular shape, and be described in a different manner.

Furthermore, a line of the table 200 may define several elementary zones, namely there is not necessarily a one-to-one relationship between the number of elementary zones of the useful screen areas of the plurality of useful screen areas, on one hand, and the number of entries in the table 200. More sophisticated definition schemes may be preferred, depending on the specific implementation.

Figure 4:
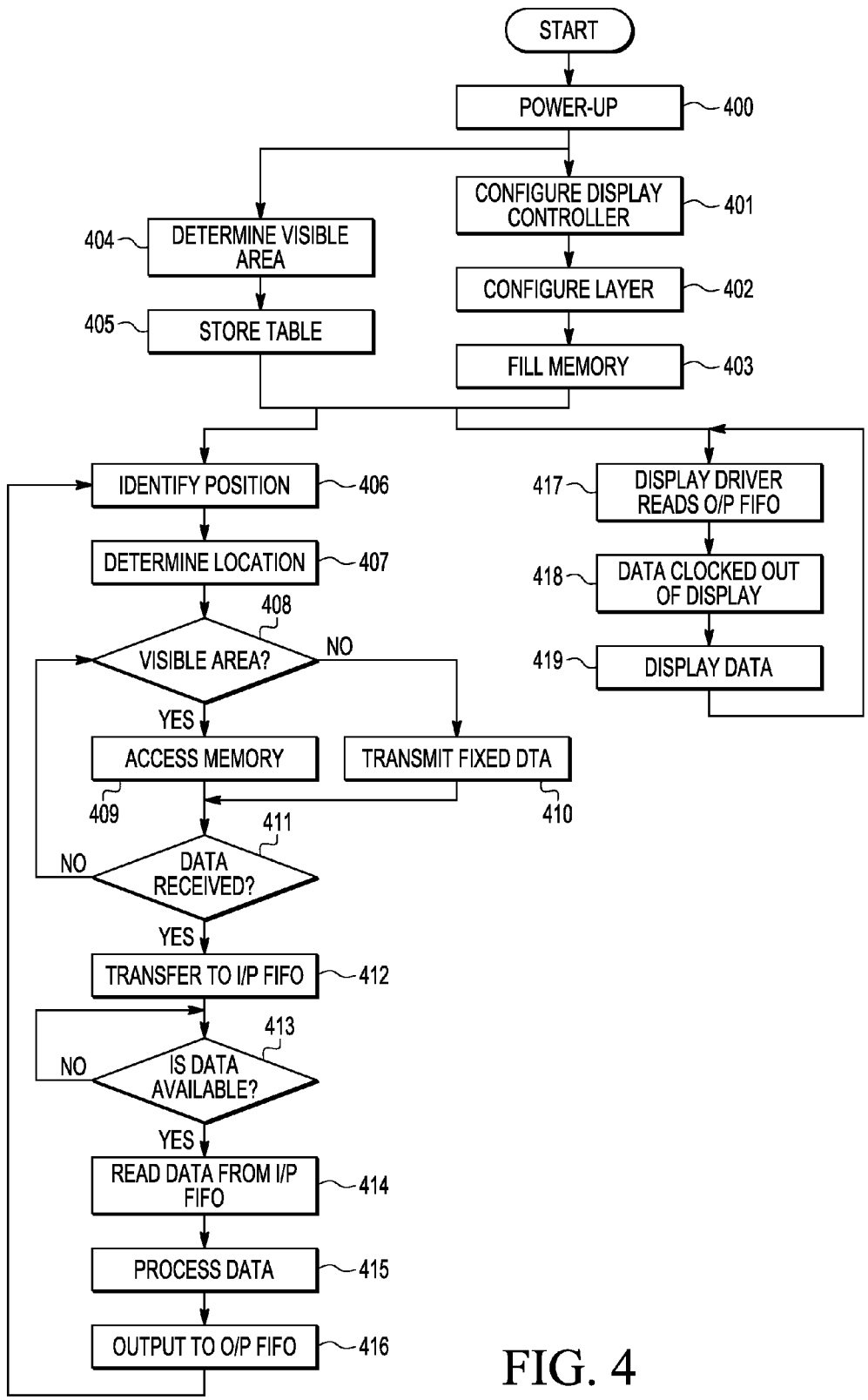
FIG. 4 shows a flow chart of an example of a method of displaying an image.

Referring to the flow-chart of FIG. 4, the example of a method illustrated thereby can be performed using the example of a display system 100 as described in the foregoing.

As shown in FIG. 4, the display system 100 is initially powered up, as shown with block 400, which allows a processing system (not shown) to configure, as shown with block 401, the data processing unit 103 according to technical features of the screen 101. For example the blending unit 107 may be configured by retrieving a blending configuration which may be stored in the CLUT 113 and which may correspond to the type of the screen 101. Thereafter, the processing system may configure, as shown with block 402, the organisation of layers and planes. Once the layers and the planes have been configured, the data memory 102 may be allowed to be filled with image data, as shown with block 403.

In parallel with the above process phases 401 to 403, when the display system 100 is powered up, the memory access control unit 114 may determine the useful screen areas of the screen 101 such as screen area 300, as shown with block 404. This may be achieved, for instance, by setting the table 200 and then store said table 200, as shown with block 405, in the local memory of the system. In another embodiment, the determining 404 and the implementing 405 may be performed after the phases 401 to 403 are complete.

Then, the memory access control unit 114 may determine, as shown with block 406, the position of a current pixel to be displayed and may also compare the position of said pixel with data in the table 200 stored in the local memory. This is to determine, as shown with block 408, whether said pixel is located or not in a useful screen area of the screen 101 such as screen area 300.

If the pixel is located in a useful screen area such as screen area 300 as shown in FIG. 3, then the memory access unit 104 accesses, as shown with block 409, the data memory 102 in order to retrieve pixel value.

Else, namely if the pixel is located in a non-useful screen area, being for instance located in the non-useful screen area 301 as shown in FIG. 3, then the memory access control unit 114 may inhibit implementation of the above mentioned phase 409, such that the memory access unit 104 does not access the data memory 102. Instead, as shown with block 410, the memory access control unit 114 may further output a substitute, e.g. fixed value to the memory access unit 104.

The memory access unit 104 may wait, as shown with block 411, until a pixel value is received from the data memory 102 or until the fixed value is received from the memory access control unit 114, as the case may be. Then, the memory access unit 104 may transfer the data thus obtained, namely the data corresponding to a pixel value fetched from data memory 102 or to the substitute value, to the FIFO input buffers 105, as shown with block 412.

As shown with block 413, the pixel format converter 106 monitors the FIFO input buffers 105 to determine if data is present therein for the pixel. If any one of the FIFO input buffers 105 is empty then the pixel format converter 106 may wait for the empty FIFO input buffers 105 to be filled in with data. Otherwise, if all FIFO input buffers 105 are filled with data, the pixel format converter 106 may read data from the FIFO input buffers 105, as shown with block 414.

Afterwards, the read data is processed as shown with block 415. This processing may comprise the pixel format converter 106 converting the data into a common format. Further, during the phase 415, the blending unit 107 may blend the data according to a blending scheme which is based, for instance, on the respective planes from which the data has been output. Furthermore, the gamma correction unit 108 may correct the blended data. For the sake of brevity, the processing 415 will not be described in details herein, but it will be apparent that any processing suitable the specific implementation may be performed.

Then the processed data is outputted into the FIFO output buffer 109, as shown with block 416.

The phase illustrated with blocks 406 to 416 are repeated for any further pixel of the screen to be displayed.

In parallel with the above process 406 to 416, the display driver 110 may read the FIFO output buffer 109, as shown with block 417, containing the processed data. The display driver 110 may translate the processed data into electrical signals, in a format suitable for controlling the screen 101. Then, the translated processed data may be clocked out, as shown with block 418, for being displayed, as shown with block 419, on the screen 101 at a predetermined time depending on the display timing. For example, the data might be clocked to the display at a rate of 148 MPixels/sec required to fill a 1920×1080 display 60 times per second. It will be apparent that any other display rate can be used. Then, the phases illustrated with blocks 417-419 are repeated for another processed pixel.

It will be noted that if the FIFO output buffer 109 fails to contain any data at all, the display driver 110 would nevertheless translate an indefinite data and this would result in an undesirable scrambled display effect visible to a user on the screen 101 which is called an underrun. Therefore, the displayed image quality may be jeopardized.

Nevertheless, the above described memory access control unit 114 and the associated method of displaying an image allows situation reducing the probability that such display artefact occur, thanks to the memory bandwidth saving which is achieved. Indeed, this situation is caused by the bandwidth of the data memory 102 being limited, and thus the display rate of the screen 101 not being followed by the data processing unit 103.

With the above described memory access control unit 114 and the associated method of displaying an image, it is thus possible to provide memory bandwidth saving and thus to allow display of images at high display rate and with enhanced display quality. To achieve this result, the above described memory access control unit and the associated method of displaying images allow identifying pixels that are located in a screen area of the screen which cannot be seen by the user, in order to inhibit memory accesses for these pixels which are useless for the user. Thanks to the save in memory bandwidth, it is possible to generate graphic data faster which would allow to update the image faster. In some applications, the screen can thus be refreshed more often, namely the images can be displayed at a higher refresh rate, without running the risk of pixel mistakes.

The actual memory bandwidth benefit depends on display contents and shape of the useful screen area but, as an estimation, the memory bandwidth gain can be of approximately 30% for applications to the dashboard of an automobile. he reduction in power consumption for the management of the display memory can be estimated to be in the same range, approximately. It should be apparent that the examples are not limited to implementations achieving these percentages.

The above described display system may be applied to the automobile field, for example in the dashboard application where display of a lot of information is needed while the surface available for display is restricted to the tiny space of the dashboard laying under the driver's eyes. Of course, the above described display system may be applied to other applications, e.g. in which it is desirable to have a useful display area that is not rectangular. Such applications include any kinds of applications wherein information needs to be displayed on a screen, for example in consumer electronics, e.g. portable electronic equipment with display.

The solution may also be implemented in a computer program for running on a computer system, at least including code portions for performing a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be provided on a tangible and non-transitory computer readable media, such as a CD-ROM or diskette, stored with data loadable in a memory of a computer system, the data representing the computer program. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

Some of the above embodiments, as applicable, may be implemented using a variety of different information processing systems. For example, although the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

In the foregoing specification, the invention has been described with reference to specific examples of embodiments of the invention. It will, however, be evident that various modifications and changes may be made therein without departing from the scope of the invention as set forth in the appended claims. It should in this respect be apparent that, because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

For example, the connections may be a type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A display system arranged to display an image on a screen having useful screen areas intended to be seen by a user and non-useful screen areas not visible by the user, comprising:
    a data memory to store pixels values of the image to be displayed;
    a data processing unit to control the display of pixels on the screen; and
    a memory access controller coupled to the data processing unit, the memory access controller to determine whether a pixel to be processed by the data processing unit to be displayed on the screen belongs to a useful screen area or to a non-useful screen area of the screen, and if the pixel belongs to a non-useful screen area, to inhibit a pixel value associated with said pixel from being fetched from the data memory to the data processing unit and to force said pixel with a fixed value to be processed by the data processing unit;
    wherein the memory access controller further to implement a memory table storing at least one binary data associated with a pixel of the image which defines whether said pixels belongs to a useful screen area of the screen or to a non-useful screen area of the screen; and
    wherein the memory access controller comprises:
    at least one counter whose output value defines a position on the screen of a current pixel to be displayed;
    at least one comparator arranged to compare the position of said current pixel with the useful screen areas defined in the table; and,
    a control unit arranged to inhibit the fetching of the pixel value associated with the current pixel from the data memory to the data processing unit and to force said current pixel with the fixed value.

2. The system of claim 1, wherein the fixed value corresponds to a black pixel when displayed on the screen.

3. The system of claim 1, wherein the memory access controller further to implement a memory table storing at least one binary data associated with one rectangular zone or a plurality of rectangular zones defining a useful screen area.

4. The system of claim 3, wherein each rectangular zone is defined, in the memory table, by:
    an offset value corresponding to the number of pixels between the first pixel of a line of pixels on the screen, and the first pixel of said line which belongs to the rectangular zone; and
    a width, in number of pixels, between the first and the last pixel of the line of pixels of the rectangular zone, associated with a number of lines for which the corresponding offset/width couple is set.

5. An integrated circuit comprising a display system as claimed in claim 1.

6. An integrated circuit as claimed in claim 5, comprising at least one of: one or more processing cores; on-chip memory; a display control unit.

7. A display arrangement, comprising a display system as claimed in claim 1 and a display connected to the display system, the display being directly driven by the display system.

8. A display arrangement as claimed in claim 7, wherein the display is part of a driver information system of a self-propelled vehicle.

9. A display arrangement as claimed in claim 8, wherein the driver information system is a dashboard.

10. A method of displaying an image comprising:
    controlling, by a data processing unit, the display of pixels of the image on a screen having useful screen areas intended to be seen by a user and non-useful screen areas not visible by the user;
    determining, by a memory access controller, whether at least one pixel to be processed by the data processing unit for display on the screen belongs to a useful screen area or to a non-useful screen area of the screen and, if the pixel belongs to a non-useful screen area, said memory access control unit inhibiting the fetching to the data processing unit of a value associated with the current pixel from a data memory storing pixels values of the image to be displayed; and
    forcing said pixel with a fixed value for the purpose of the processing by the data processing unit;
    wherein the memory access controller comprising at least one counter, at least one comparator and a control unit, and wherein the method further comprises:

identifying a position on the screen of a current pixel to be displayed, performed by the counter whose output value defines said position;

comparing the position of said pixel with the useful screen areas defined in the table, performed by the comparator; and inhibiting the fetching of the value associated with the pixel from the memory to the data processing unit and forcing said pixel with the fixed value.

11. The method of claim 10, wherein the fixed value corresponds to a black pixel on the screen.

12. The method of claim 10, wherein the method further comprises the phase of implementing, by the memory access control unit, a memory table storing at least one binary data associated with a pixel of the image which defines whether said pixels belongs to a useful screen area of the screen or to a non-useful screen area of the screen.

13. The method of claim 10, wherein the method further comprises the phase of implementing, by the memory access control unit, a memory table storing at least one binary data associated with one rectangular zone or a plurality of rectangular zones for defining a useful screen area.

14. The method of claim 13, wherein the method further comprises the phase of defining each rectangular zone, in the memory table, by:

an offset between the first pixel of the line on the screen, and the first pixel of a line of pixels in the rectangular zone; and a width, in number of pixels, between the first and the last pixel of the line in the rectangular zone, associated with a number of lines for which the corresponding offset/width couple is set.

15. A non-transitory computer program product comprising one or more stored sequences of instructions that are accessible to a processor and which, when executed by the processor, cause the processor to:

control a display of pixels of the image on a screen having useful screen areas intended to be seen by a user and non-useful screen areas not visible by the user;

determine whether at least one pixel to be processed by the data processing unit for display on the screen belongs to a useful screen area or to a non-useful screen area of the screen and, if the pixel belongs to a non-useful screen area, said memory access control unit inhibiting the fetching to the data processing unit of a value associated with the current pixel from a data memory storing pixels values of the image to be displayed; and force said pixel with a fixed value for the purpose of the processing by the data processing unit;

identify a position on the screen of a current pixel to be displayed;

compare the position of said pixel with the useful screen areas defined in a table; and inhibit the fetching of the value associated with the pixel from the memory to the data processing unit and forcing said pixel with the fixed value.

16. The non-transitory computer program product of claim 15, wherein the fixed value corresponds to a black pixel on the screen.

17. A display system arranged to display an image on a screen having useful screen areas intended to be seen by a user and non-useful screen areas not visible by the user, comprising:

a data memory to store pixels values of the image to be displayed;

a data processing unit to control the display of pixels on the screen; and a memory access controller coupled to the data processing unit, the memory access controller to determine whether a pixel to be processed by the data processing unit to be displayed on the screen belongs to a useful screen area or to a non-useful screen area of the screen, and if the pixel belongs to a non-useful screen area, to inhibit a pixel value associated with said pixel from being fetched from the data memory to the data processing unit and to force said pixel with a fixed value to be processed by the data processing unit;

wherein the memory access controller further to implement a memory table storing at least one binary data associated with one rectangular zone or a plurality of rectangular zones defining a useful screen area; and wherein each rectangular zone is defined, in the memory table, by:

an offset value corresponding to the number of pixels between the first pixel of a line of pixels on the screen, and the first pixel of said line which belongs to the rectangular zone; and a width, in number of pixels, between the first and the last pixel of the line of pixels of the rectangular zone, associated with a number of lines for which the corresponding offset/width couple is set.

* * * * *